United States Patent

[11] 3,595,332

| [72] | Inventor | Grant H. Sanstrom<br>P.O. Box 2515, Yakima, Wash. 98902 |
| --- | --- | --- |
| [21] | Appl. No. | 766,078 |
| [22] | Filed | Oct. 9, 1968 |
| [45] | Patented | July 27, 1971 |

[54] CRAWLER-TYPE VEHICLE
7 Claims, 9 Drawing Figs.

[52] U.S. Cl. .................................................. 180/6.7,
305/32, 180/9.64, 180/70 R
[51] Int. Cl. ........................................... B62d 11/02,
B62d 11/08
[50] Field of Search ............................................ 180/6.7,
9.52, 9.2, 77, 9.64; 305/32

[56] References Cited
UNITED STATES PATENTS

| 1,423,642 | 7/1922 | Beal et al. .................... | 180/6.7 |
| --- | --- | --- | --- |
| 1,522,157 | 1/1925 | Tracy et al. ................... | 305/32 X |
| 1,583,157 | 5/1926 | Jett ............................... | 305/32 X |
| 3,036,652 | 5/1962 | Barenyi ........................ | 180/77 X |

*Primary Examiner*—A. Harry Levy
*Attorneys*—Clarence A. O'Brien and Harvey B. Jacobson ABSTRACT: A drive system including a first rotary drive shaft, a pair of driven rotary half shafts and a pair of rotary jackshafts. The shafts generally parallel each other and the jackshafts are supported for independent swinging movement about the half shafts toward and away from the drive shaft. Longitudinally spaced portions of the drive shaft are drivingly connected to the jackshafts through drive belts trained about pulleys on the drive and jackshafts. The jackshafts are drivingly connected to the half shafts through drive chains trained about sprocket wheels on the jack and half shafts and brake means are operatively associated with the jackshafts for braking the latter when they are moved toward the shafts, which movement of the jackshafts simultaneously untensions the belts drivingly connecting the shaft to the jackshafts.

Grant H. Sanstrom
INVENTOR.

Grant H. Sanstrom
INVENTOR

Grant H. Sanstrom
INVENTOR

BY Clarence A. O'Brien
and Harvey B. Jacobson
Attorneys

Grant H. Sanstrom
INVENTOR.

CRAWLER-TYPE VEHICLE

The vehicle of the instant invention is a crawler-type vehicle and includes selectively drivable and brakeable opposite side endless tread assemblies and is therefore drivable, steerable and brakeable in the same manner in which crawler-type tractors such as bulldozers are drivable, steerable and brakeable. Accordingly, the vehicle of the instant invention is highly maneuverable, offers excellent driving traction and may be driven over substantially all types of unimproved terrain.

The vehicle includes a main frame structure which may be of any suitable configuration depending upon the use to which the vehicle is to be put and the power and drive assemblies of the vehicle including the gear changing, clutching and braking assemblies are carried by a subframe which may be readily removed from the main frame for servicing and repair and which is adjustable relative to the main frame from which the endless track members of the vehicle are supported whereby adjustment of the subframe relative to the main frame will accomplishment adjustment in the tensioning of the endless crawler treads of the vehicle.

Although it is envisioned that the vehicle will have many uses in transporting personnel and materials as well as equipment over virgin terrain, it is also to be understood that the vehicle will also be useful wherever a lightweight crawler-type tractor may be utilized to advantage.

The main object of this invention is to provide a crawler threaded vehicle of lightweight but rugged construction and which will be capable of supporting and transporting or towing other laden vehicle over unimproved terrain.

Another object of this invention is to provide a vehicle in accordance with the preceding object and which includes structural features enabling ready adjustment of the endless crawler tread vehicle.

Still another object of this invention is to provide a vehicle including an engine, transmission and clutch assembly as well as a brake assembly supported from a subframe removably mounted on the main frame of the vehicle whereby necessary adjustments and maintenance or repairs may be readily performed.

A final object of this invention to be specifically enumerated herein is to provide a vehicle in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
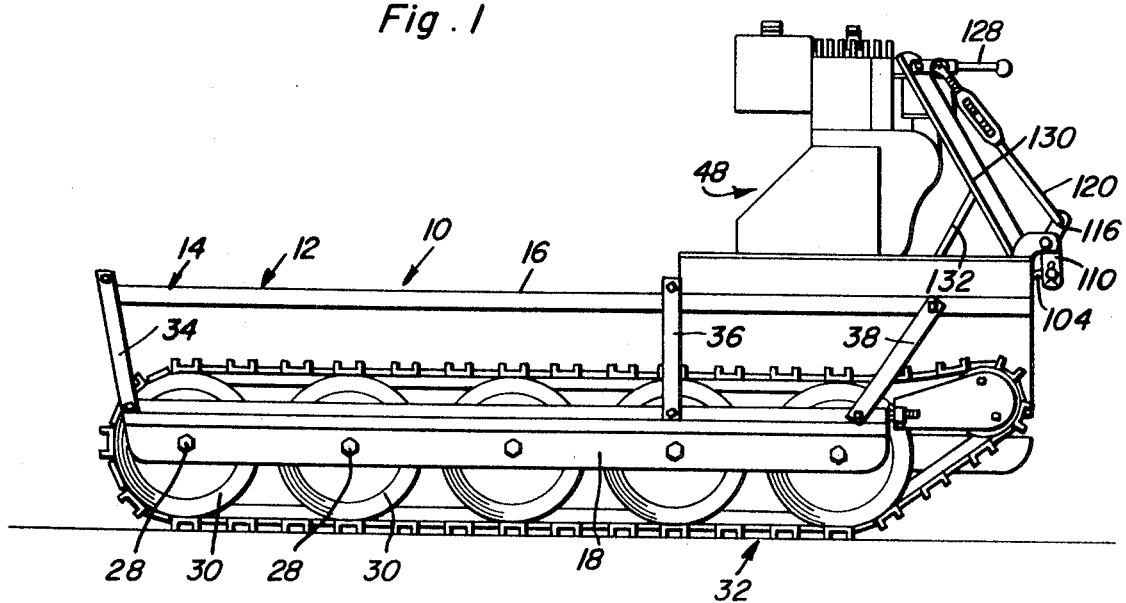
FIG. 1 is a side elevational view of the vehicle.

Referring now more specifically to the drawings the numeral 10 generally designates the vehicle of the instant invention which includes a main frame referred to in general by the reference numeral 12. The main frame 12 includes outer opposite side frame assemblies generally referred to by the reference numerals 14 including upper and lower longitudinally extending members 16 and 18 as well as inner opposite side frame assemblies generally referred to by the reference numerals 20 interconnected by means of transverse frame members 22 and 24. The inner opposite side frame assemblies 20 include lower longitudinally extending angle members 26 and a plurality of longitudinally spaced and transversely extending axle shaft members 28 are secured between each pair of longitudinal members 18 and angle members 26. Each of the axle shaft members 28 has a support wheel 30 journaled thereon and an endless flexible track assembly referred to in general by the reference numeral 32 is trained about each set of support wheels 30.

A plurality of support members such as upstanding support members 34, 36 and 38 are secured between corresponding longitudinal members 16 and 18 and a load supporting floor 40 is secured between the side frame assemblies 20. In addition, the main frame 12 includes transverse members 42 and 44 secured between the outer opposite side frame assemblies 14 and also the inner opposite side frame assemblies 20.

Figure 3:
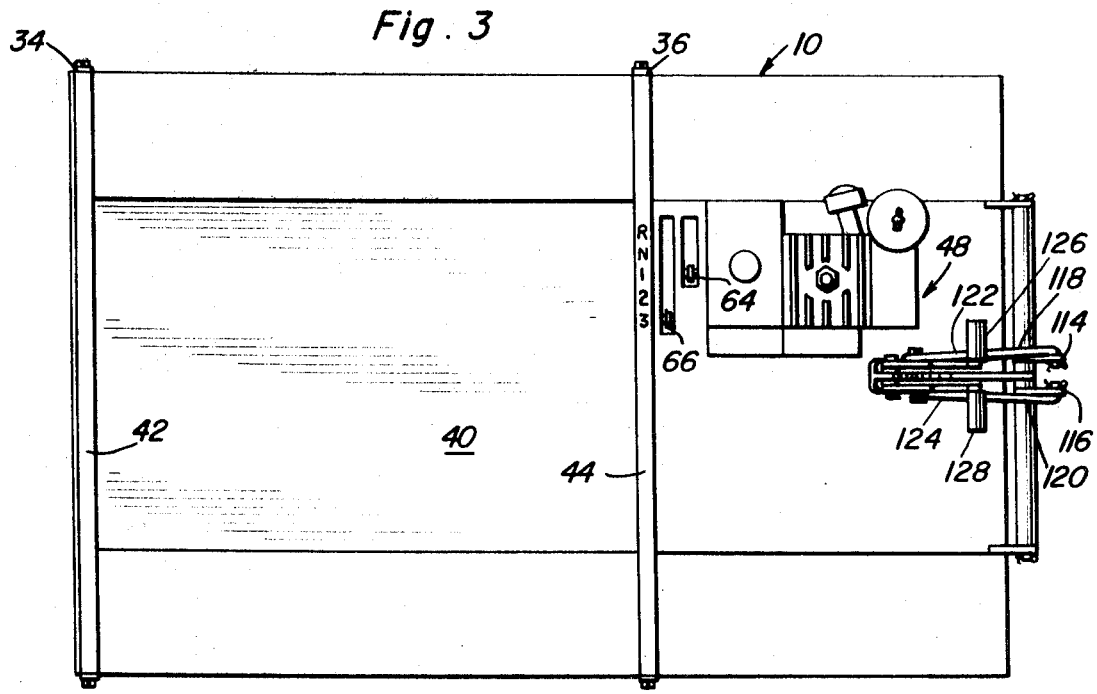
FIG. 3 is a top plan view of the vehicle.
Figure 9:
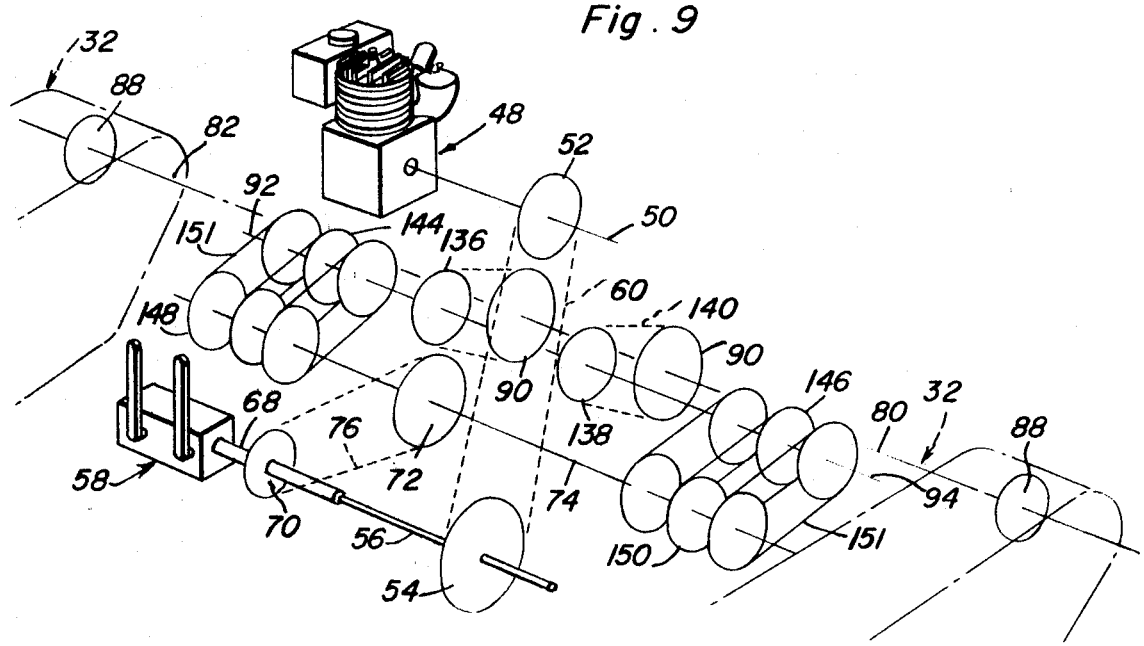
FIG. 9 is a schematic view of the drive train of the vehicle.

With attention now invited more specifically to FIGS. 4—8 of the drawings there may be seen a subframe generally referred to by the reference numeral 46. A motor referred to in general by the reference numeral 48, see FIG. 1, is mounted on an upper portion of the subframe 46 and includes an output shaft 50 having a sprocket wheel 52 mounted thereon aligned with a torque input sprocket wheel 54 mounted on the input shaft portion 56 of a suitable transmission referred to in general by the reference numeral 58, such as a James transmission model 3R25 available from the J. I. Edwins Co. Inc. of Issaquah, Wash. An endless chain 60 drivingly couples the sprocket wheel 52 to the sprocket wheel 54 and the latter comprises a part of an integral manually actuatable clutch assembly 62 actuatable by lever 64, see FIG. 3. The transmission includes three forward speeds and one reverse speed and the gear changing of the transmission is accomplished through the shifting of the gearshift lever 66, see FIG. 3.

The transmission 58 includes an output shaft 68 upon which a drive sprocket 70 is mounted and the drive sprocket is aligned with a drive sprocket 72 carried by a drive shaft 74 journaled from the subframe 46. An endless flexible chain 76 drivingly couples the sprocket wheel 70 to the sprocket wheel 72 and it may be seen that the drive shaft 74 is journaled from the frame 46 by means of journal blocks 78, see FIG. 6.

Figure 2:
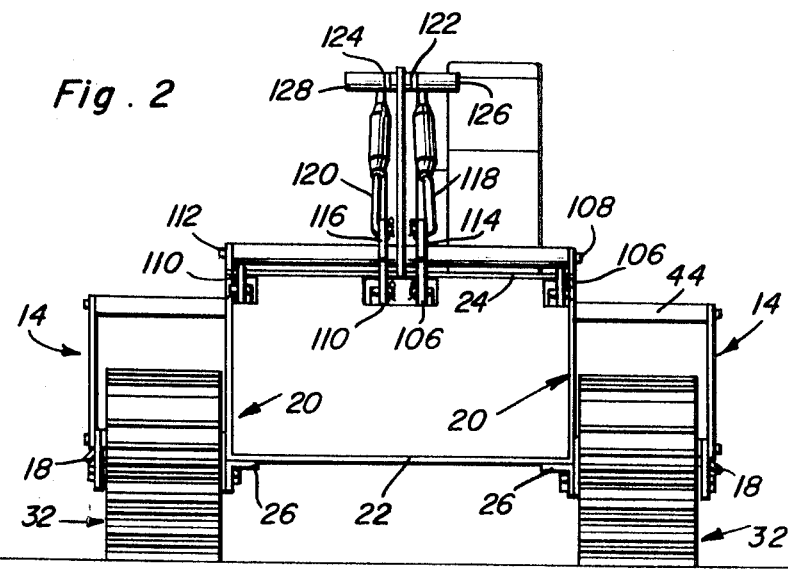
FIG. 2 is a rear elevational view of the vehicle.
Figure 4:
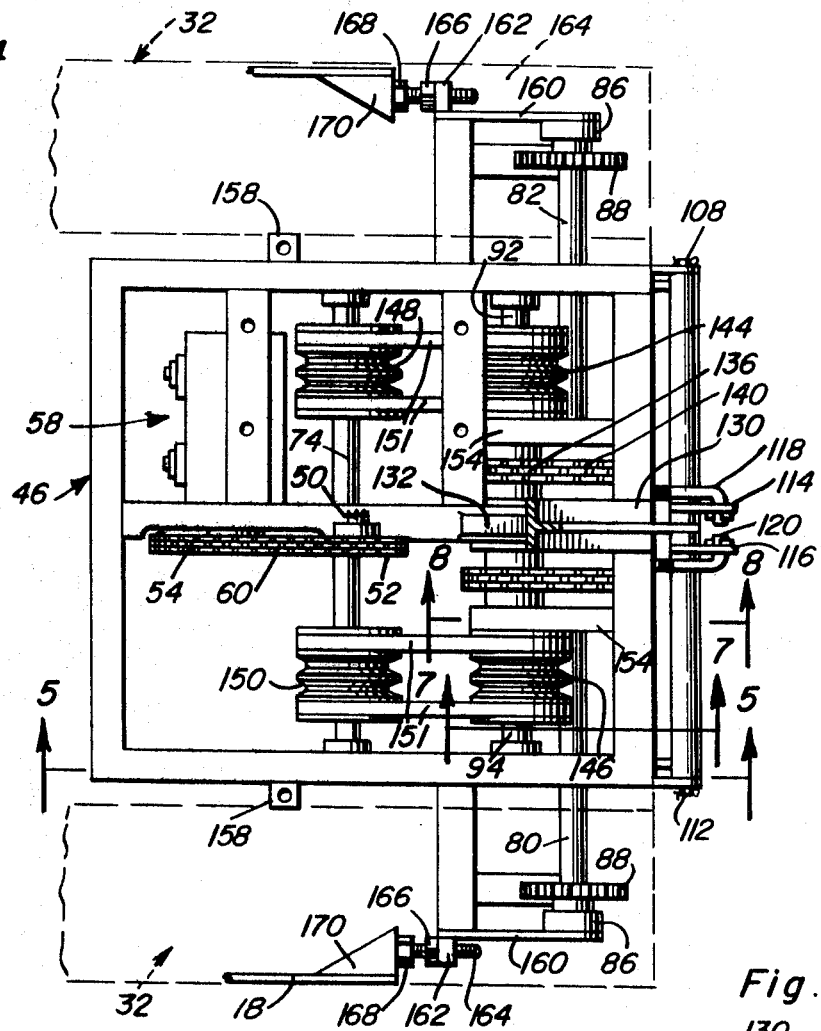
FIG. 4 is a top plan view of the subframe of the vehicle from which the power plant, transmission and braking and clutching mechanisms are supported with portions of the power plant and controls for the clutching and braking assemblies broken away and illustrated in horizontal section and the adjacent crawler tread portions of the vehicle illustrated in phantom lines.
Figure 7:
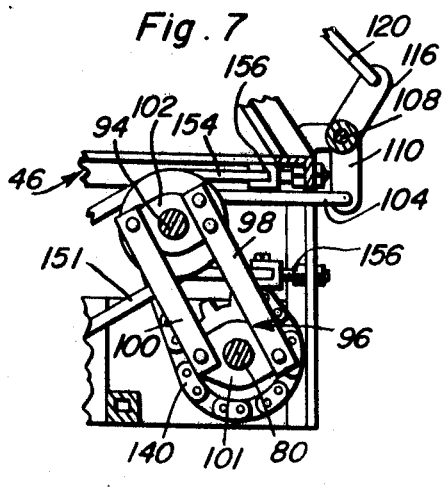
FIG. 7 is a fragmentary vertical sectional view taken substantially upon the plane indicated by section line 7-7 of FIG. 4.
Figure 6:
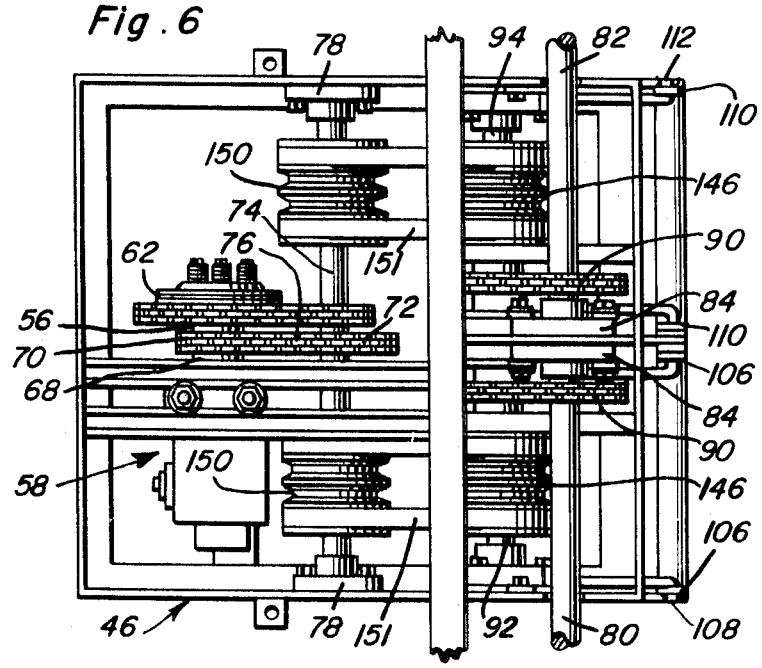
FIG. 6 is a bottom plan view of the central portion of the assemblage illustrated in FIG. 4.

A pair of opposite side shafts 80 and 82 are journaled from the subframe 46 by inner and outer journal blocks 84 and 86 and include drive sprockets 88 on their remote ends, see FIGS. 4 and 6. The adjacent ends of the half shafts 80 and 82 include driven sprockets 90 and a pair of jackshafts 92 and 94 are swingably supported from the subframe 46 by means of parallelogram arm assemblies 96, see FIG. 7. The opposite ends of each of the shafts 92 and 94 are swingably supported and journaled by means of a pair of the parallelogram linkage assemblies 96 and each assembly 96 includes a pair of parallel arm members 98 and 100 attached at one pair of corresponding ends to a journal 101 on the corresponding half shaft and interconnected at their other pair of corresponding ends by means of a journal block 102. Each journal block 102 rotatably journals the adjacent end of the corresponding jackshaft and each arm 98 has one end of a control rod 104 pivotally secured thereto. The control rods 104 operatively associated with the jackshaft 92 have the other pair of corresponding ends thereof pivotally secured to actuating levers 106 carried by a first operating shaft 108 journaled from the rear of the corresponding side of the subframe 46 and the rearward ends of the control rods 104 operatively associated with the jackshaft 94 have their rearward ends pivotally connected to similar actuating levers 110 carried by an operating shaft 112 corresponding to the operating shaft 108. The shafts 108 and 112 have operating levers 114 and 116 secured thereto which project rearwardly and upwardly from the rearward end of the subframe 46 and have the lower ends of a pair of control rods 118 and 120 pivotally secured thereto. The upper ends of the control rods 118 and 120 are pivotally connected to actuating levers 122 and 124 including handles 126 and 128 pivotally supported from the upper end of a forwardly and upwardly inclined support 130 whose lower end is secured to the subframe 46 and braced relative to the latter by means of a bracing member 132. From FIGS. 1 and 2 of the drawings it may be seen that the control rods 118 and 120 comprise turnbuckle assemblies whereby their effective length may be adjusted and it may also be appreciated that oscillation of the levers 122 and 124 will cause oscillation of the shaft 108 and 112. Of course, as the shafts 108 and 112 are oscillated, the parallelogram linkage assemblies 96 will be oscillated thereby causing the jackshafts 92 and 94 to be oscillated. The jackshafts 92 and 94 include sprocket wheels 136 and 138 aligned with the sprocket wheels 90 carried by the half shafts 80 and 82 and a pair of endless flexible chains 140 drivingly connect the sprocket wheels 136 and 138 to the sprocket wheels 90. In addition, the jack shafts 92 and 94 have multiple groove pulleys 144 and 146 mounted thereon aligned with similar multiple groove pulleys 148 and 150 mounted on the opposite ends of the drive shaft 74. A plurality of endless flexible belts 151 are trained about the pulley wheels 144 and 148 and the pulley wheels 146 and 150 and thereby drivingly connect the opposite end portions of the drive shaft 74 to the jackshafts 92 and 94 when the endless flexible belts 151 are properly tensioned, either one, two, three or four belts 151 may be used on each set of pulley wheels carried by the drive shaft and the jackshafts.

Figure 8:
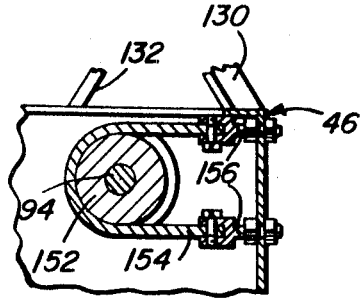
FIG. 8 is a fragmentary enlarged vertical sectional view taken substantially upon the plane indicated by the section line 8-8 of FIG. 4.
Figure 5:
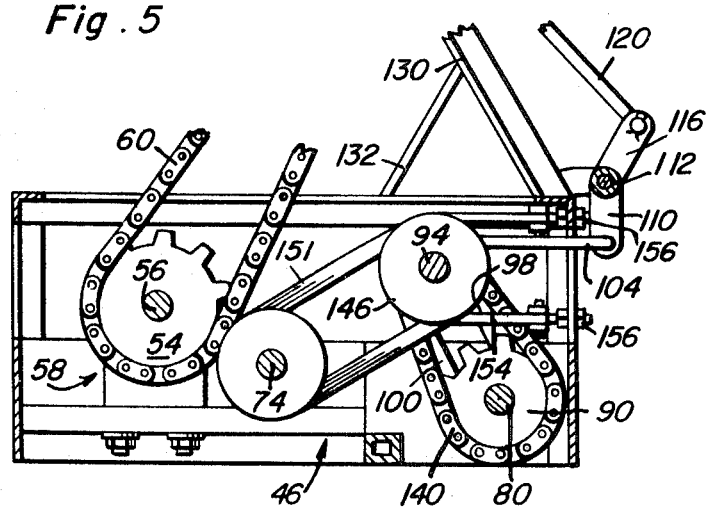
FIG. 5 is a fragmentary vertical sectional view taken substantially upon the plane indicated by section line 5-5 of FIG. 4.

The pulley wheels 144 and 146 include fifth sheaves 152, see FIG. 8 and a pair of elongated flexible brake bands 154 are trained about the fifth sheaves 152 of the pulley wheels 144 and 146 and have their opposite ends secured to the subframe 46 by means of adjustable anchors 156.

The subframe 46 is supported from the main frame 12 in any convenient manner and is shiftable longitudinally of the latter. The subframe 46 includes outwardly projecting apertured lugs 158, see FIG. 4, through which fasteners (not shown) are secured to maintain the subframe 46 in adjusted shifted position. The sprocket wheels 88 have the endless track members 32 trained thereabout and the sprocket wheels 88 are drivingly engaged with the endless track members 32. In addition, the journal blocks 86 are carried by support plates 160 and each support plate 160 of the subframe 46 includes an outwardly projecting abutment 162 having a threaded bore formed therethrough in which an adjusting bolt 164 is threaded. A jamnut 166 is threadedly engaged on each bolt 164 for cooperation with the corresponding abutment 162 and the head 168 of each bolt 164 abuttingly engages an abutment member 170 carried by the corresponding longitudinal member 18 at its rearward end. Accordingly, in order to adjust the endless track members 32, the fasteners (not shown) secured through the mounting lugs 158 may be loosened and the bolt 164 may be turned after the jamnuts 156 have been loosened. Thereafter, the jamnuts 166 may again be tightened so as to retain the subframe 46 in its adjusted position prior to the fasteners (not shown) being secured to the apertured mounting lugs 158.

The subframe 46 is removably supported from the main frame 12 and therefore may be readily removed for maintenance or repair on the motor 48, the transmission 58 or any of the drive components merely by untensioning the endless track members 32 and lifting the subframe 46 from the main frame 12.

In operation, after the motor 48 has been started, the clutch lever 64 and shift lever 66 may be operated to place the transmission 58 in the proper gear. Then, as the clutch lever 64 is shifted to the clutch engaged position, the drive from the motor 48 to the half shafts 80 and 82 is established. If it is desired to declutch either the endless track members 32, the corresponding lever of the control levers 122 and 124 is pulled rearwardly which will swing the corresponding jackshaft forwardly and untension the associated belts 151. Further rearward movement of that control lever will of course shift the corresponding jackshaft further forwardly to frictionally engage the corresponding sheave 152 with its brake band 154 to thereby brake the jackshaft and the corresponding and endless tread member. Accordingly, the vehicle 10 not only includes the clutch 62 comprising an integral portion of the transmission 58, but also a clutch and braking mechanism for each of the jackshafts.

The foregoing is considered as illustrative only of the principles of the invention. Further, since numerous modifications and changes will readily occur to those skilled in the art, it is not desired to limit the invention to the exact construction and operation shown and described.

What I claim as new is as follows:

1. A drive system including a first rotary drive shaft, a pair of driven rotary half shafts generally paralleling said drive shaft, and a pair of rotary jackshafts generally paralleling said driven half shafts, means supporting said jackshafts for selected independent swinging about the axes of rotation of said driven half shafts toward and away from said drive shaft, longitudinally spaced portions of said drive shaft and corresponding jackshafts including pulley means, endless flexible belts trained about said pulley means for drivingly connecting said spaced portions of said drive shaft to said jackshafts, means drivingly connecting said jackshafts to said half shafts, and brake means operatively associated with said jackshafts and operative to brake the latter in response to swinging of said jackshafts toward said drive shaft from a position swung away from the latter with said belts tensioned, a vehicle frame, said frame including opposite side endless tread assemblies each including an endless track member trained about suitable idle wheels, said half shafts including drive sprocket wheels mounted on the remote ends thereof and about which the rearward ends of said endless track members are trained with said drive sprocket wheels drivingly engaged with said endless track members.

2. The combination of claim 1 wherein said supporting means includes parallelogram linkage means supporting said jackshafts for swinging movement relative to said half shafts.

3. The combination of claim 2 wherein, said means drivingly connecting said jackshafts to said half shafts includes aligned sprocket wheels on said jack and half shafts and endless chains trained about corresponding sprocket wheels.

4. The combination of claim 2 wherein, said brake means includes a brake drum mounted on each of said jackshafts for rotation therewith and a U-shaped stationarily supported brake band opening away from said drive shaft trained about the side of each brake drum adjacent said drive shaft.

5. A crawler-type vehicle including a main frame, a pair of sets of idle wheels aligned horizontally along opposite sides of said main frame and journaled solely from the latter, a pair of endless tread members trained about said sets of idle wheels and including rearward portions projecting rearwardly and upwardly of the rearwardmost idle wheels of said sets of wheels, said endless tread members having upper and lower runs, the upper portion of each of said idler wheels being in engagement with and supporting said upper runs and the lower portions of each of said idler wheels being in engagement with and supported on said lower runs, a subframe, means supporting said subframe from said main frame for ready upward removal therefrom, and including means for shifting of said subframe longitudinally of the main frame, ad means operative to secure said subframe in longitudinally shifted adjusted positions on said main frame, motor means supported from said subframe, shaft means journaled from said subframe and including remote end portions provided with drive sprocket wheels about which the rearward portions of said tread members are trained with said drive sprocket wheels drivingly engaged with said tread members, and power transmission means carried by said subframe drivingly connecting said motor to said shaft means.

6. The combination of claim 5 wherein said power transmission means includes means operative to selectively simultaneously and individually drive said remote ends of said shaft means in opposite directions, simultaneously and individually declutch said motor means from the remote ends of said shaft means and simultaneously and individually brake the declutched remote ends of said shaft means.

7. A vehicle main frame including opposite side longitudinally extending endless crawler tread assemblies, corresponding ends of said assemblies including drive wheels mounted on inwardly projecting half shafts journaled from said main frame, a pair of jackshafts journaled from said main frame and swingable through arcs having their centers of curvature coinciding with the axes of rotation of said half shafts, corresponding pairs of aligned drive wheels mounted on said jackshafts and half shafts and endless flexible drive members trained over said pairs of wheels drivingly connecting the jackshafts to the half shafts, a drive shaft journaled from said frame toward and away from which said jackshafts are swingable, said drive shaft and jackshafts including corresponding pairs of aligned pulleys, endless belts trained over each pair of the last mentioned pulleys, said jackshafts each also having brake drums mounted thereon for rotation therewith, and a pair of brake bands passed about the sides of said brake drums adjacent said drive shaft and having their opposite ends anchored to said main frame on the sides of said jackshafts remote from said drive shaft, whereby said jackshaft may be swung toward said drive shaft so as to untension said endless belts and thereafter further swung toward said drive shaft to tension said brake bands about said drums in order to brake said jackshafts.